United States Patent [19]

Fabiny et al.

[11] Patent Number: 4,806,161

[45] Date of Patent: Feb. 21, 1989

[54] COATING COMPOSITIONS

[75] Inventors: William J. Fabiny, Harleysville; Judith M. Shabrach, Boyertown, both of Pa.

[73] Assignee: Teleflex Incorporated, Limerick, Pa.

[21] Appl. No.: 128,622

[22] Filed: Dec. 4, 1987

[51] Int. Cl.$^4$ ............................ C09D 5/08; C04B 9/02
[52] U.S. Cl. ............................... 106/14.12; 106/14.21; 428/450; 428/469
[58] Field of Search .......................... 106/14.21, 14.12; 428/450, 689

[56] References Cited

U.S. PATENT DOCUMENTS

| | | | |
|---|---|---|---|
| 4,532,289 | 7/1985 | Mosser et al. | 524/545 |
| 4,537,632 | 8/1985 | Mosser | 106/14.12 |
| 4,544,408 | 10/1985 | Mosser et al. | 106/14.12 |
| 4,548,646 | 10/1985 | Mosser et al. | 106/14.12 |

Primary Examiner—Theodore Morris
Attorney, Agent, or Firm—Reising, Ethington, Barnard, Perry & Milton

[57] ABSTRACT

A coating composition and method of making the same wherein the composition includes an acid binder aqueous solution which comprises phosphate ions and ions from the group of chromate or molybdate ions and thixotropic ingredients for forming a three dimensional crosslinked network which renders the composition in a gel state when not subjected to movement and in a liquid state when subjected to movement. Surface tension modifying ingredients reduce surface tension of the composition without loss of the three dimensional, crosslinked network.

31 Claims, No Drawings

COATING COMPOSITIONS

TECHNICAL FIELD

The present invention relates to stable thixotropic coating compositions. More specifically, the present invention relates to coating compositions which are ideally suited for application to parts to be coated by dip spinning or dipping of the metal parts.

BACKGROUND ART

While it has been shown that coating compositions such as those disclosed in the U.S. Pat. No. 4,548,644 to Mosser et al and assigned to the assigne of the present invention are suitable for dip-spin application to small parts such as fasteners, the thixotropic nature of the coatings causes problems when applied over fasteners which contain blind holes, fine threads and recessed heads, like Phillips crossheads, Torx ®, and other types of fasteners. These problems arise from the fact that due to the low shear forces exerted in the aforementioned areas, the thixotropic nature of the compositions does not allow full return of the coating to its liquid state thus providing the good flow and leveling exhibited on adjacent unencumbered areas of the fastener being coated. This lack of flow and leveling in these areas often gives rise to excessive build-up of coating, usually resulting in coated parts which are nonuseable, that is, rejected parts.

While there are physical means employed to facilitate the proper flow and leveling, such as fewer parts processed at a given time, increased spin time and centrifugal force and use of inserts to reorient parts, these means have only shown marginal improvement in solving the aforementioned problem. When employed in production operations, these means can diminish the throughput capacity for bulk coated parts, thereby defeating the purpose for which bulk processing is intended. Adjustments in the compositions within the spirit of the invention of the Mosser et al patent to allow lower viscosities also shows some improvement, but not yet such improvement as is required for various industrial applications.

During research and development, applicant has attempted to overcome the lack of flow and leveling in the compositions by incorporating wetting agents, i.e. surface tension modifiers, surfactants, to improve the flow and leveling. These wetting agents can be nonionic, anionic or cationic. The Mosser et al patent discloses the use of nonionic surfactants to establish what is referred to as the thixotropic network. The acid stable nonionic surfactant is capable and does form a three dimensional, crosslinked network with an amorphous silica. The nonionic surfactant is present in the composition at relatively low concentrations. Larger amounts of the nonionic surfactant adversely affect the consistency of the desired composition. Because the compositions are water based and therefore highly polar, it was demonstrated that nonionic species could be used for the practice of making compositions of the Mosser et al patent and that anionic and cationic wetting agents were not useful in establishing the thixotropic network.

Through experimentation, applicant has found that the addition of an anionic surfactant to the composition of the Mosser et al patent, in an attempt to reduce the surface tension of the composition, resulted in the viscosity previously established by the practice of the Mosser et al patent to be substantially lowered so as to render the composition substantially unusable for practical purposes. In these experiments, sodium 2-ethyl hexyl sulfate was used.

Another anionic material based on polysulfonic acid designated by the manufacturer (Henkel Corp., Minneapolis, Minn.) as a thickener and fluid friction reducer was added by applicant to the composition of the Mosser et al patent. This addition resulted in a significant increase in viscosity. When used alone in a precursor of the composition disclosed in the Mosser et al patent without the nonionic surfactant and silica, the polysulfonic acid thickened the material. To obtain viscosities that were suitable for good coating film development, high levels of the polysulfonic were required, giving the coated articles brittle films and marginal adhesion.

The present invention provides a coating composition which exhibits improved viscosity stability and improved wettability of intricate surfaces such as fine threads and recessed heads particularly when applied by dip-spin methods to small metal parts such as fasteners. The invention results in better flow and leveling of the compositions and less rejected unusable coated parts.

SUMMARY OF THE INVENTION

In accordance with the present invention, there is provided a coating composition including an acid binder aqueous solution which comprises phosphate ions and ions from the group of chromate or molybdate ions and thixotropic ingredients for forming a three dimensional, crosslinked network which renders the composition in gel state when not subject to movement and in a liquid state when subject to movement. The composition includes surface tension modifying ingredients for reducing surface tension of the composition without loss of the three dimensional, crosslinked network.

The present invention further provides a method of making the coating composition, the method including the steps of preparing the acid binder aqueous solution which comprises the phosphate ions and ions of the group of chromate or molybdate ions, and forming a three dimensional network in the binder which renders the composition in a gel state when not subject to movement and in a liquid state when subject to movement. The surface tension of the composition is reduced without losing the three dimensional crosslinked network.

DETAILED DESCRIPTION OF THE COMPOSITION

Generally, the present invention provides an acid binder aqueous solution which comprises phosphate ions and ions of the group of chromate or molybdate ions and thixotropic ingredients for forming a three dimensional crosslinked network which renders the composition in a gel state when not subjected to movement and in a liquid state when subjected to movement. The composition further includes surface tension modifying ingredients for reducing surface tension of the composition without loss of the three dimensional, crosslinked network. The composition provides improved flow properties over the prior art when in the liquid state while retaining the ability to return to the gel state established by prior art compositions which lack these improved flow properties.

More specifically, the surface tension modifying ingredients include the combination of an anionic surfactant and anionic friction reducer.

The anionic friction reducer can be based on polysulfonic acid. An example of an anionic friction reducer is Rheothik Polymer 80-11, manufactured by Henkel Corp. of Minneapolis, Minn. The Rheothik Polymer 80-11 is characterized as functioning as a rheology control agent in water systems and organic solvents. The polymer is very stable in solutions of most commonly used acids and bases. It is a viscous clear liquid having a pH of between 0.5 and 1.0.

The anionic surfactant can be selected from the group including alkylaryl sulfonates, alkylaryl polyether sulfonates, alkyl sulfates, alkyl polyether sulfates, and diphenyloxide disulfonates. The following is a list of suitable surfactants useful in the practice of the present invention: XBSA-74 Sodium alkyl polyether sulfonate (PPG Industries); Aerosol OS Sodium alkyl aryl sulfonate (Cyanamid): Witconate D51-51 Sodium alkyl aryl sulfate (witco); Dowfax 2AO Diphenyl oxide disulfonate (DoW); Nas 08 Sodium ethylhexyl sulfate (Niacet Corp.); Nas 07 Sodium heptadecyl sulfate (Niacet Corp.); Nas 04 Sodium tetradecyl sulfate (Niacet Corp.); and Avenel S Sodium alkyl polyether sulfonate (PPG Industries).

The composition can include 0.1% to 5% of the anionic surfactant and 0.1% to 5% of the friction reducer by weight percent of the total composition weight. Preferably, the composition includes 0.5 to 1% of the anionic surfactant and 0.25% to 1% of the friction reducer by weight percent of total composition weight.

The composition can have a pH range of 0.5 to 3, preferably a pH range of 1.5 to 2.3.

The composition can include 40% to 70% solids, and preferably 50% to 65% solids.

The composition can have a viscosity range of 800 to 4000 cps, and preferably a viscosity range from 1000 to 2000 cps, viscosity being measured by Brookfield Heliopath Viscometer, T-C shaft, 6 rpm at 74°-77° F.

The acid thixotropic composition of the present invention is made from an aqueous solution which preferably contains phosphate anions and chromate (or dichromate) and/or molybdate anions. A great variety of such solutions are known for treatment of metal surfaces. Such compositions used for coating solutions or dispersions for protective coating of metals are disclosed in the U.S. Pat. No. 3,248,251 to Allen, issued April 1966, U.S. Pat. No. 3,869,293 to Braumbauh, issued March 1975, U.S. Pat. No. 3,248,249 to Collins, issued April 1966, U.S. Pat. No. 3,857,717 to Wydra et al, issued December 31, 1974, U.S. Pat. No. 3,081,146 to Boies et al, issued March 12, 1963, U.S. Pat. No. 2,245,609 to Romig, issued June 17, 1941, U.S. Pat. No. 3,967,984 to Helwig, issued July 6, 1976, U.S. Pat. No. 3,443,977 to Bennetch, issued Mar. 13, 1969, and U.S. Pat. No. 3,562,011 to Hirst et al, issued February 1971 and incorporated herein for reference.

The thixotropic ingredients can include an acid stable noncolloidal amorphous silica and a nonionic surfactant, such as that disclosed in the U.S. Pat. No. 4,458,646 to Mosser et al, issued Oct. 22, 1985. The solutions that contain the particulate solid materials, such as, metals are generally referred to as "binders". The amorphous silica ingredient used in the coating composition is a substantially dehydrated, polymerized silica which can be considered as a condensation polymer of silicic acid. Fumed silica, precipitated silica and silica gel are ideally suited for the present invention. The amorphous silica is used in accordance with the present invention are free of stabilizing alkali metal ions (or equivalent ions) or other counter ions, and are not in the form of a suspension.

The silica gel used with the present invention is generally of low, intermediate, or high density. The apparent bulk density may vary from 0.67 to about 0.17 and the apparent particle density from 1.1 to 0.75 and the true particle density is about 2.20. The average pore diameter may vary from about 22-26 to 180-220 angstrom. The pore volume (ml/g) varies from about 0.37 to about 2.0. The surface area ($m^2/g$) from about 750-800 to about 100-200.

The amorphous silicas preferred for use with the present invention have an average particle size of less than about 1 micron. In general, the amorphous silicas as used with the present invention are characterized in that they have a surface which is partially or completely hydroxylated. The hydroxyl groups are capable of crosslinking with the other ingredients of the composition, especially the nonionic surfactant.

The acid stable thixotropic coating composition of the present invention includes the acid-stable nonionic surfactant which is capable of and does form a three dimensional crosslinked network with the amorphous silica. Preferably, the surfactant is an ethoxylated alkylphenol or alkylphenoxypoly(ethyleneoxy)ethanol, an ethoxylated aliphatic alcohol; polyoxyethylene, a carboxylic ester like a glycerol ester (mono-or di); and other equivalent nonionic surfactants. Typical suitable ethoxylated alkylphenols are alkylphenols of $C_8$ to $C_{12}$ alkylphenols. It is most preferred that they be water-soluble, those having at least 60 weight percent of polyoxyethylene groups being particularly well suited. Such ethoxylated alkylphenols are well-known under various trademarks such as Igepol, Levelene, Neutronyx, Solar NP, the Surfonic series, and the Triton N and X series. It is to be noted, however, that the solubility of a particular nonionic surfactant in water is not necessarily determinative and not as important as its ability to crosslink with the amorphous silica. What is most important is that the surfactant be soluble enough to crosslink with silica. It is to be noted that a particular nonionic surfactant may have limited solubility in an aqueous system (a 2-phase system) yet may be quite effective in the system of the invention because its limited solubility will be adequate to crosslink with the amorphous silica in the system of the invention (which is a multi-phase system).

Among the polyoxyethylenes suitable for use in accordance with the invention are the mono- and dialkyl ethers or ethylene glycols and their derivatives. Typical of other nonionics are the monobutyl ether, ethylene glycol monobutyl ether acetate, ethylene glycol monoethyl ether acetate, ethylene glycol dibutyl ether, ethylene glycol monohexyl ether, ethylene glycol monomethyl ether, ethylene glycol monomethyl ether acetate, ethylene glycol monophenyl ether and other equivalent ethers of ethylene glycol. Another group of nonionics particularly well suited for the preparation of the thixotropic coating compositions of the invention are the polyethylene glycols and the alkoxy derivatives, particularly lower alkoxy, such as methoxy polyethylene glycol; also diethylene glycols, propylene glycol and other similar glycols.

The nonionic surfactant forms the three dimensional crosslinked network with amorphous silica. This appears to protect it from being chemically attached by the acidic chromate. Other polyfunctional chemicals which do not have this desirable property are not suitable for use in this invention. The crosslinking of the two above discussed components is, in the case of fumed silica, normally through and at the silanol and/or the siloxane groups.

It is hypothesized that the addition of the anionic surfactant to the thixotropic composition reduces the crosslink density of the three dimensional network established by the nonionic surfactant and amorphous silica resulting in lowering of the viscosity of the composition. The viscosity is then recovered to a usable level with the addition of the polysulfonic acid, such addition of the polysulfonic acid being at levels much lower than those needed of the polysulfonic acid alone in precursor or thixotropic compositions. The composition of the resulting coatings display modified thixotropic and psuedo plastic viscosity behavior allowing the good flow and leveling required to suitably coat recess head fasteners, fine threads, and other fine detailed parts without the heavy build problems previously associated with compositions of the Mosser et al patent.

Insoluble inorganic particles can be incorporated into the binder. Among these inorganic particles are aluminum, chrominum, and zinc. Aluminum particles are most preferred. Ideally, the aluminum particles are of a very small size, such as atomized aluminum. In addition to aluminum powder, other metal pigments may be added such as silicon, magnesium-aluminum alloy powder, or an inert pigment as the oxides of these metals, such as $Al_2O_3$ or $SiO_2$, etc. Specifically, the particulate solid material can be chosen from the group including aluminum, zinc, an oxide of silicon, zirconium, beryllium or aluminum, iron, chromium, a refractory carbide, nitride, silicide or boride, or alloys thereof.

The composition can include leachable-nonleachable corrosion inhibitors, and metal flake or metallic alloy flake pigments. These compositions can further include atomized metal and metallic powders, preferably mixtures of atomized aluminum powder and aluminum flake pigment. Such compositions are disclosed in the copending patent application to Mosser et al, filed Dec. 4, 1986.

The composition can further include a leachable chromate pigment, the leachable chromate pigment being a nondissolved hexavalent chromate. Preferably, the composition includes 1% to 20% by weight of particles of the leachable chromate pigment based on the weight of the other solids in the coating composition. The addition of such leachable chromate pigments is further disclosed in the copending patent application to Mosser, which is a continuation-in-part of application Ser. No. 555,477, filed Nov. 28, 1983.

The present invention provides a coating primarily used in the application by the dip-spin process. The coating made in accordance with the present invention may also be sprayed on, rolled on, brushed, dipped or flow or coil coated.

The coating composition may be applied to any metal, including steel, stainless steel, aluminum, titanium, or any metal that can be heated to an approximate curing temperature of about 525° F. Likewise, alloys of these metals can be coated. While especially desirable for coating metal parts, nonmetallic surfaces may also be coated, such as plastic, ceramic, fibrous or others.

Although the present invention is ideally suited for parts having intricate configurations, the coating may also be applied by dipping or brushing or by using more traditional methods. Other metal configurations or parts can likewise be coated.

The coating made in accordance with the present invention may also be further coated with a top coat to add any desirable characteristics such as increased lubricity, coating for ultraviolet resistance, light resistance, detorque resistance, and have the appearances of a metallic or zinc plated part. These coated parts are so produced in accordance with the present invention and will have remarkably greater corrosion resistance and other desirable properties. Further post treatment may be supplied by an inorganic top coat containing ceramic oxide and other types of pigment thereby increasing heat resistance.

The present invention further provides a method of making the coating composition, generally including the steps of preparing the acid binder aqueous solution which comprises phosphate ions and ions of the group of chromate or molybdate ions, forming the three dimensional network in the binder which renders the composition in a gel state when not subject to movement and in a liquid state when subject to movement, and reducing the surface tension in the composition without losing the three dimensional crosslinked network.

More specifically, the nonionic surfactant and noncolloidal amorphous silica are added to the binder solution to set up the three dimensional crosslinked network. The friction reducer and anionic surfactant are then added to the composition to reduce the surface tension of the composition without losing the three dimensional crosslinked network.

The present invention further provides a coated metal part comprising a metallic or nonmetallic substrate coated with the coating composition of the present invention.

The following examples are illustrative of the present invention and are not intended to be limiting. Example 1 illustrates a coating composition made in accordance with the present invention. The example illustrates the composition and method of making the same. Example 2 illustrates a second composition made in accordance with the present invention further including metallic flake and sphere powders.

Example 3 discloses an embodiment of the composition including leachable chromates.

Examples 4, 5 and 6 demonstrate the criticality of the combination of the anionic surfactant and polysulfonic acid.

Examples 7, 8 and 9 demonstrate the effects of modifying the content of anionic surfactant.

Examples 10, 11, 12 and 13 demonstrate that improved coating compositions of the present invention can be made by adding the anionic surfactant prior to the nonionic surfactant.

EXAMPLE 1

A coating composition of the present invention was prepared as follows:

A. Preparation of Chromate-Phosphate Binder A-A.

| Water (deionized) | 850 ml |
|---|---|
| Magnesium Oxide | 15.07 gm |
| Chromic Acid | 73.63 gm |
| Phosphoric Acid (85%) | 129.5 ml |
| Magnesium Carbonate | 46.8 gm |
| Hydrogen Peroxide (35%) | 3.9 ml |

The above components were admixed under continuous stirring.

B. Preparation of Coating B

| Binder A | 385 ml |
|---|---|
| Atomized Aluminum Powder | 342 gm |
| Fumed Silica | 12.33 gm |
| Nonionic Surfactant | 0.12 gm |

The binder and aluminum powder were admixed and dispersed at high speed. The fumed silica was added under stirring until dispersed; the nonionic surfactant was added to give a thixotropic composition with a Bookfield Heliopath viscosity of 2000 cps.

C. The preparation of the coating composition C was continued as follows:

| Coating B | 450 ml |
|---|---|
| Anionic Surfactant (sodium 2 ethyl hexyl sulfate 39% active) | 16 ml |

Admixing the above yielded a composition with Brookfield Heliopath viscosity of 400 cps.

D. The final composition of the invention is prepared by admixing the following:

| Coating C | 466 ml |
|---|---|
| Polysulfonic Acid (17% solution in water) | 37 ml |

Stirring the above components yielded a coating with Brookfield Heliopath viscosity of 1100 cps. This coating was applied to fasteners with recessed heads and demonstrated the ability to deposit coating in the head and evacuate same to provide a thin uniform coating upon curing at 650° F. This coating did not prevent proper insertion of a tool bit drive commonly used when these fasteners are used in assembly operations.

EXAMPLE 2

A coating composition which uses flake and sphere powders was made according to the following formula:

| Binder II | |
|---|---|
| Deionized Water | 500 ml |
| Chromic Acid | 27.9 gm |
| 85% Phosphoric Acid | 85 gm |
| Magnesium Carbonate | 18.73 gm |
| Coating Composition II | |
| Binder II | 504 ml |
| Spherical Aluminum Powder ESD 3.4 m | 230.36 gm |
| Non Leafing Aluminum Flake Powder, Reynolds 4-301 | 32.91 gm |
| Potassium Perfluoroalkyl Sulfonate FC-95, 3M Co. | 0.25 gm |
| Blend 15 minutes using high speed mixer then add: | |
| Fumed Silica, Cab-O-Sil M-5 | 9.4 gm |
| Nonionic Surfactant, 10% Solution of Triton X-100 | 1.2 ml |

Stir 10 minutes. The above Composition has a Brookfield Heliopath viscosity of 3800 cps.

An improved composition as contemplated by the invention is made as follows:

| Composition II | 500 ml |
|---|---|
| Anionic Surfactant, NAS 08 Niacet Corp. | 17.74 ml |
| Polysulfonic Acid (17% Solution in Water) Rheothik 80-11, Henkel Corp. | 40.7 ml |

The improved composition has a Brookfield Heliopath viscosity of about 2000 cps and was dip spin applied to recessed head fasteners after which the coating was shown to have coated and cleared the recesses and did not prevent proper insertion of a tool bit driver commonly used when these fasteners are used in assembly operations.

EXAMPLE 3

An improved coating composition which incorporates leachable chromates is made according to the following formula:

| Binder III | |
|---|---|
| Deionized Water | 850 ml |
| Magnesium Oxide | 15.07 gm |
| Chromic Acid | 73.63 gm |
| 85% Phosphoric Acid | 129.5 ml |
| Magnesium Carbonate | 46.8 gm |
| 35% Hydrogen Peroxide | 3.9 ml |
| Coating Composition III | |
| Binder III | 425 ml |
| Atomized Aluminum Powder | 260 gm |
| Blend high speed for 20 minutes. | |
| Chromate Dispersion | |
| Binder III | 500 ml |
| Strontium Chromate | 400 gm |

Ball mill four hours, then add 64 gm to Composition III and blend high speed additional 10 minutes.

Final composition is achieved as follows:

| Metal Powder - Chromate Dispersion | 684 gm |
|---|---|
| Fumed Silica, Cab-O-Sil M-5 | 11.04 gm |
| Nonionic Surfactant, 10% solution of Triton X-100 | 0.93 ml |
| Anionic Surfactant, NAS08 Niacet Corp. | 15.6 ml |
| Polysulfonic Acid (17% Solution in Water) Rehothik 80-11, Henkel Corp. | 37.86 ml |

The improved composition has a Brookfield Heliopath viscosity of 1328 cps.

EXAMPLES 4, 5, 6

The following examples demonstrate the effects of adding the polysulfonic acid (Rheothik 80-11) to a thixotropic composition made in accordance with the disclosure of the U.S. Pat. No. 4,548,646 to Mosser, issued Oct. 22, 1985, without the presence of the anionic surfactant.

| Chromate-Phosphate Binder A | |
|---|---|
| Water (Deionized) | 850 ml |

-continued

| Chromate-Phosphate Binder A | |
|---|---|
| Magnesium Oxide | 15.07 gm |
| Chromic Acid | 73.63 gm |
| Phosphoric Acid (85%) | 129.5 ml |
| Magnesium Carbonate | 46.8 gm |
| Hydrogen Peroxide (35%) | 3.9 ml |

The above components were admixed under continuous stirring.

| Coating B | |
|---|---|
| Binder A | 400 ml |
| Atomized Aluminum Powder | 334 gm |
| Fumed Silica | 14.2 gm |
| 10% Solution Nonionic Surfactant | 1.22 ml |

To separate quantities of Coating B, polysulfonic acid was added at levels of 1, 3 and 5% (active) based on total weight of the coating. Brookfield Heliopath viscosities were determined on Coating B prior to addition of polysulfonic acid and on the final composition after addition. Recessed head fasteners were coated with each composition and a percentage of heads not coated was determined for each.

| | 1% Level | 3% Level | 5% Level |
|---|---|---|---|
| Quantity Coating B | 502 ml | 500 ml | 500 ml |
| Brookfield Heliopath Ctg. B | 3403 cps | 3569 cps | 3403 cps |
| Quantity Polysulfonic Acid | 43.6 ml | 131.7 ml | 217.9 ml |
| Brookfield Heliopath Final Comp | 3569 cps | 6972 cps | 9794 cps |
| Final Composition Solids | 52.41% | 48.27% | 44.71% |
| % Recessed Heads Not Coated | 58.33% | 75% | 83.33% |

EXAMPLES 7, 8, 9

The following examples demonstrate the effects of adding polysulfonic acid at 1% level and anionic surfactant at levels of 0.25%, 0.5% and 0.75% (active) to coatings of the Mosser 3646 patent as exhibited by Coating B of examples 4, 5 and 6.

| | 0.25% | 0.5% | 0.75% |
|---|---|---|---|
| Quantity Coating B | 488 ml | 495 ml | 496 ml |
| Brookfield Heliopath Viscosity | 3818 cps | 3735 cps | 3652 cps |
| Quantity Anionic Surfactant | 4.34 ml | 8.74 ml | 13.14 ml |
| Brookfield Heliopath Viscosity | 2324 cps | 830 cps | 664 cps |
| Qty. Polysulfonic Acid (1% active) | 42.6 ml | 42.8 ml | 42.9 ml |
| Brookfield Heliopath Viscosity | 3403 cps | 1909 cps | 1494 cps |
| Final Composition Solids | 52.28% | 52.31% | 52.3% |
| % Recess Heads Not Coated | 50% | 0% | 0% |

EXAMPLES 10, 11, 12, 13

The following examples demonstrate that while the anionic surfactant does not participate in the initial development of thixotropic coatings of the Mosser '646 patent, improved coating compositions of the present invention can be made by adding the anionic surfactant prior to the nonionic surfactant which at this point does not fully establish thixotropy due to interference from the anionic surfactant. Anionic surfactant was added at levels of 0.25, 0.5, 0.75 and 1.0 active. All other constituents are constant as in previous examples.

| Coating B | | | | |
|---|---|---|---|---|
| Binder A | | | 400 ml | |
| Atomized Aluminum Powder | | | 334 gm | |
| Fumed Silica | | | 14.2 gm | |
| Blend, then add: | | | | |
| Anionic Surfactant | | | variable | |
| Nonionic Surfactant | | | 1.24 ml | |
| Polysulfonic Acid (17% solution in water) | | | variable | |
| Quantity Coating B | 515 ml | 516 ml | 513 ml | 514 ml |
| Brookfield Heliopath Viscosity | 498 cps | 498 cps | 498 cps | 498 cps |
| Anionic Surfactant | 4.6 ml | 9.2 ml | 13.7 ml | 18.3 ml |
| Brookfield Heliopath Viscosity | 498 cps | 498 cps | 498 cps | 498 cps |
| Nonionic Surfactant (10% soln) | 1.24 ml | 1.24 ml | 1.24 ml | 1.24 ml |
| Brookfield Heliopath Viscosity | 2407 cps | 830 cps | 581 cps | 498 cps |
| Polysulfonic Acid | 44.83 ml | 44.96 ml | 44.65 ml | 44.79 ml |
| Brookfield Heliopath Viscosity | 3403 cps | 1992 cps | 1494 cps | 1411 cp |
| Final Composition Solids | 52.62% | 52.34% | 52.48% | 52.17% |
| % Recess Heads Not Coated | 58.33% | 0% | 0% | 0% |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A coating composition comprising: an acid binder aqueous solution which comprises phosphate ions and ions of the group of chromate or molybdate ions; thixotropic ingredients for forming a three dimensional, crosslinked network which renders said composition in a gel state when not subject to movement and in a liquid state when subject to movement; and surface tension modifying ingredients for reducing surface tension of said composition without loss of said three dimensional, crosslinked network.

2. A coating composition comprising: an acid binder aqueous solution which comprises phosphate ions and ions of the group of chromate or molybdate ions; thixotropic ingredient for forming a three dimensional, crosslinked network which renders said composition in a gel state when not subject to movement and in a liquid state when subject to movement; and surface tension modifying ingredients for reducing surface tension of said composition without loss of said three dimensional, crosslinked network, said surface tension modifying ingredients including the combination of an anionic surfactant and an anionic friction reducer.

3. A coating as set forth in claim 2 further characterized by said friction reducer being based on polysulfonic acid.

4. A coating as set forth in claim 3 further characterized by said anionic surfactant being selected from the group including alkyl polyether sulfonates, alkylaryl sulfonates, alkylaryl polyether sulfates, and diphenyloxide disulfonates.

5. A coating as set forth in claim 4 further characterized by including 0.1% to 5.0% of said anionic surfactant and 0.1% to 5% of said friction reducer by weight percent of total composition weight.

6. A coating as set forth in claim 5 further characterized by including 0.5 to 1.0% of said anionic surfactant and 0.25 to 1.0% of said friction reducer by weight percent of total composition weight.

7. A coating as set forth in claim 5 further characterized by having a pH range of 0.5 to 3.

8. A coating as set forth in claim 7 further characterized by having a pH range of 1.5 to 2.3.

9. A coating as set forth in claim 7 further characterized by including 40% to 70% solids.

10. A coating as set forth in claim 9 further characterized by including 50 to 65% solids.

11. A coating as set forth in claim 7 further characterized by having a viscosity range from 800 to 4000 cps.

12. A coating as set forth in claim 11 further characterized by having a viscosity range from 1000 to 2000 cps.

13. A coating as set forth in claim 2 further characterized by said thixotropic ingredients including an acid stable noncolloidal amorphous silica and a nonionic surfactant.

14. A coating as set forth in claim 2 further characterized by including a particulate solid material of the following: zinc, aluminum, an oxide of the following: silicon, zirconium, beryllium or aluminum, iron, chromium, a refractory carbide, nitride, silicide, or boride or alloys thereof.

15. A coating as set forth in claim 2 or 14 further characterized by including a leachable chromate pigment.

16. A coating as set forth in claim 15 further characterized by said chromate pigment being a nondissolved hexavalent chromate.

17. A coating as set forth in claim 16 further characterized by including 1 to 20% by weight of particles of a leachable chromate pigment based on weight of other solids in said coating composition.

18. A coating as set forth in claim 2 or 14 further characterized by including atomized metallic and metallic alloy powders.

19. A coating as set forth in claim 18 further characterized by including metallic and/or metallic alloy flake pigments.

20. A coating as set forth in claim 19 further characterized by including a mixture of atomized aluminum powder and aluminum flake pigments.

21. A method of making a coating composition, said method including the steps of: preparing an acid binder aqueous solution which comprises phosphate ions and ions of the group of chromate or molybdate ions; forming a three dimensional network in the binder which renders the composition in a gel state when not subject to movement and in a liquid state when subject to movement; and modifying the surface tension of the composition without losing the three dimensional, crosslinked network.

22. A method of making a coating composition, said method including the steps of: preparing an acid binder aqueous solution which comprises phosphate ions and ions of the group of chromate or molybdate ions; forming a three diemnsional network in the binder which renders the composition in a gel state when not subject to movement and in a liquid state when subject to movement; and modifying the surface tension of the composition without losing the three dimensional, crosslinked network by adding to the binder an anionic surfactant and admixing an anionic friction reducer.

23. A method as set forth in claim 21 wherein the friction reducer is based on polysulfonic acid.

24. A method as set forth in claim 23 wherein the anionic surfactant is selected from the group including alkyl polyether sulfonates, alkyaryl sulfonates, alkylaryl polyether sulfates, and diphenyloxide disulfonates.

25. A method as set forth in claim 24 wherein said forming step is further defined as admixing to the binder an acid stable, noncolloidal amorphous silica and a nonionic surfactant.

26. A method as set forth in claim 25 including the step of adding to the binder a particulate solid of the following: zinc, aluminum, an oxide of the following: silicon, zirconium, beryllium or aluminum, iron, chromium, a refractory carbide, nitride, silicide, or boride or alloys thereof.

27. A method as set forth in claim 21 or 26 further including the step of admixing to the binder a leachable chromate pigment.

28. A method as set forth in claim 21 or 26 further including the step of admixing to the binder metallic and/or metallic alloy flake pigments.

29. A coated metal part comprising a metallic substrate, a coating deposited over said metallic substrate, said coating comprising: an acid binder aqueous solution which comprises phosphate ions and ions of the group of chromate or molybdate ions; thixotropic ingredients for forming a three dimensional, crosslinked network which renders said composition in a gel state when not subject to movement and in a liquid state when subject to movement; and surface tension modifying ingredients for reducing surface tension of said composition without loss of said three dimensional, crosslinked network.

30. A coated metal part as in claim 29 further charcterized by said coating including a particulate solid of the following: zinc, aluminum, an oxide of the following: silicon, zirconium, beryllium or aluminum, iron, chromium, a refractory carbide, nitride, silicide, or boride or alloys thereof.

31. A coated metal part comprising a metallic substrate, a coating deposited over said metallic substrate, said coating comprising: an acid binder aqueous solution which comprises phosphate ions and ions of the group of chromate or molybdate ions; thixotropic ingredients for forming a three dimensional, crosslinked network which renders said composition in a gel state when not subject to movement and in a liquid state when subject to movement; and surface tension modifying ingredients for reducing surface tension of said composition without loss of said three dimensional, crosslinked network, said surface tension modifying ingredients including the combination of an anionic surfactant and an anionic friction reducer.

* * * * *